United States Patent
Bhangu et al.

(10) Patent No.: US 12,143,263 B2
(45) Date of Patent: Nov. 12, 2024

(54) SYSTEM AND METHOD FOR CORDON OF O-CLOUD NODE

(71) Applicants: RAKUTEN MOBILE, INC., Tokyo (JP); RAKUTEN SYMPHONY, INC., Tokyo (JP)

(72) Inventors: Manmeet Bhangu, Indore (IN); Pankaj Shete, Tokyo (JP); Jyoti Bose, Tokyo (JP)

(73) Assignees: Rakuten Symphony India Private Limited, Indore (IN); RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/019,108

(22) PCT Filed: Dec. 28, 2022

(86) PCT No.: PCT/US2022/054143
§ 371 (c)(1),
(2) Date: Feb. 1, 2023

(87) PCT Pub. No.: WO2024/102154
PCT Pub. Date: May 16, 2024

(65) Prior Publication Data
US 2024/0267287 A1 Aug. 8, 2024

(30) Foreign Application Priority Data
Nov. 9, 2022 (IN) .............................. 202221063941

(51) Int. Cl.
*H04L 45/745* (2022.01)
*H04L 41/052* (2022.01)
(Continued)

(52) U.S. Cl.
CPC ........ *H04L 41/0803* (2013.01); *H04L 41/052* (2022.05)

(58) Field of Classification Search
CPC ... H04L 41/0803; H04L 41/052; H04L 48/16; H04L 48/18; H04L 88/12; H04L 45/745; H04L 45/02
(Continued)

(56) References Cited

U.S. PATENT DOCUMENTS

| 11,838,176 B1 * | 12/2023 | Vanjare ................. G06F 9/4451 |
| 2021/0258866 A1 | 8/2021 | Chou |
| 2024/0106709 A1 * | 3/2024 | Shete .................. H04L 41/0631 |

OTHER PUBLICATIONS

Written Opinion (PCT/ISA/237) dated Apr. 18, 2023 issued by the International Searching Authority in application No. PCT/US22/54143.
(Continued)

*Primary Examiner* — Jude Jean Gilles
(74) *Attorney, Agent, or Firm* — Sughrue Mion, PLLC

(57) ABSTRACT

Provided are a method and system for cordoning an open radio access network (O-RAN) cloud (O-Cloud) node The method may include: receiving, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC); transmitting, by the SMO function to an Infrastructure Management Services (IMS) and/or Deployment Management Services (DMS) via an O2 interface, a second request to cordon the at least one O-Cloud node based on the received first request; and receiving, from the IMS/DMS, a first notification that the at least one O-Cloud node has been cordoned, wherein the SMO function is at least one of a Federated O-Cloud Orchestration and Management (FO-COM) and Network Function Orchestration (NFO).

20 Claims, 5 Drawing Sheets

(51) Int. Cl.
*H04L 41/0803* (2022.01)
*H04L 45/02* (2022.01)

(58) Field of Classification Search
USPC .......................................... 709/222
See application file for complete search history.

(56) References Cited

OTHER PUBLICATIONS

International Search Report (PCT/ISA/210) dated Apr. 18, 2023 issued by the International Searching Authority in application No. PCT/US22/54143.

* cited by examiner

SYSTEM AND METHOD FOR CORDON OF O-CLOUD NODE

CROSS REFERENCE TO RELATED APPLICATIONS

This application is a National Stage of International Application No. PCT/US2022/054143 filed Dec. 28, 2022, claiming priority based on Indian Patent Application No. 202221063941 filed Nov. 9, 2022.

FIELD

System and methods consistent with example embodiments of the present disclosure relate to cordoning an open radio access network (O-RAN) cloud (O-Cloud) node in order to prevent a scheduler from placing new deployments onto the O-Cloud node.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system, as well as to automate and optimize RAN operations. The RIC is divided into two types: a non-real-time RIC (Non-RT RIC) and a near-real-time RIC (Near-RT RIC).

The Non-RT RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN centralized Unit (O-CU), O-RAN Distributed Unit (O-DU), etc.).

The Near-RT RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The Near-RT RIC uses the E2 interface to control the underlying RAN elements (E2 nodes/network functions (NFs)) over a near-real-time control loop. The Near-RT RIC monitors, suspends/stops, overrides, and controls the E2 nodes (O-CU, O-DU, and O-eNB) via policies. For example, the Near-RT sets policy parameters on activated functions of the E2 nodes. Further, the Near-RT RIC hosts xApps to implement functions such as quality of service (QoS) optimization, mobility optimization, slicing optimization, interference mitigation, load balancing, security, etc. The two types of RICs work together to optimize the O-RAN. For example, the Non-RT RIC provides, over the A1 interface, the policies, data, and AI/ML models enforced and used by the Near-RT RIC for RAN optimization, and the Near-RT returns policy feedback (i.e., how the policy set by the NON-RT RIC works).

The SMO framework, within which the Non-RT RIC is located, manages and orchestrates RAN elements. Specifically, the SMO includes the Federated O-Cloud Orchestration and Management (FOCOM), a Network Function Orchestrator (NFO) that manages Virtual Machines (VM) based Virtual Network Functions (VNF) and container (i.e., instance) based VNF, and the OAM as a part of the SMO that manages and orchestrates what is referred to as the O-RAN Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides Infrastructure Management Services (IMS) and Deployment Management Services (DMS). The O2 interface may also send O2 telemetry data to the SMO, e.g., O-Cloud configuration or any logical function data, energy consumption, health status of node, etc.

In the related art, the O-Cloud nodes may be drained for a variety of reasons, for example, the O-Cloud node may be drained in order to perform hardware upgrade, software upgrade, kernel upgrade, energy efficiency or optimization processes, prior to node shutdown, etc. However, a scheduler in the SMO which may be responsible for instantiating network functions in the O-Cloud nodes, may not be aware that the node is being drained, and this may inadvertently cause errors if the scheduler attempts to instantiate a network function in an O-Cloud node which is being drained. Therefore, there is a need to be able to indicate that the O-Cloud node should no longer be able to be scheduled (i.e., in an unschedulable state).

SUMMARY

Example embodiments of the present disclosure provide a method and system for cordoning an O-Cloud node in order to mark the O-Cloud node as unschedulable. Particularly, prior to the O-Cloud node being drained, an SMO function (e.g., at least one of the FOCOM and the NFO) may request for the IMS/DMS to cordon the O-Cloud node, thereby marking it not being able to be scheduled by a scheduler of the SMO (i.e., an unschedulable state).

Accordingly, example embodiments of the present disclosure may avoid scheduling errors (for instance, scheduling the instantiation of a network function when the O-Cloud node is being drained).

According to embodiments, a method for cordoning one or more Open Radio Access Network (O-RAN) Cloud (O-Cloud) nodes may be provided. The method may include receiving, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC); transmitting, by the SMO function to an Infrastructure Management Services (IMS) and/or Deployment Management Services (DMS) via an O2 interface, a second request to cordon the at least one O-Cloud node based on the received first request; and receiving, from the IMS/DMS, a first notification that the at least one O-Cloud node has been cordoned, wherein the SMO function is at least one of a Federated O-Cloud Orchestration and Management (FOCOM) and Network Function Orchestration (NFO).

The second request may be an instruction to cordon a first O-Cloud node of the at least one O-Cloud node, wherein the first notification indicates that the first O-Cloud node has been condoned, the method may further include: transmitting, by the SMO function to the IMS/DMS via an O2 interface, a third request to cordon a second O-Cloud node of the at least one O-Cloud node based on the received first request; and receiving, from the IMS/DMS, a second notification that the second O-Cloud node has been cordoned.

The first request may be triggered by rApp of the Non-RT RIC or by a manual request submitted via a Service Management and Orchestration Framework (SMO).

The second request may only transmitted by the SMO function to the IMS/DMS based on determining, by the SMO function, that the first request to cordon the at least one O-Cloud node is valid.

The method may further include controlling, by the IMS/DMS, to cordon the at least one O-Cloud node based on the second request to mark the O-Cloud node as unschedulable.

Receiving the first notification that the O-Cloud node has been cordoned may further include receiving, from the IMS/DMS by the SMO function via the O2 interface, the first notification that the at least one O-Cloud node has been cordoned.

Receiving the first notification that the O-Cloud node has been cordoned may further include: receiving, from the SMO function by the rApp of the Non-RT RIC, the first notification that the at least one O-Cloud node has been cordoned.

According to embodiments, an apparatus for cordoning one or more Open Radio Access Network (O-RAN) Cloud (O-Cloud) nodes may be provided. The apparatus may include at least one processor configured to execute computer-executable instructions to: receive, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC); transmit, by the SMO function to an Infrastructure Management Services (IMS) and/or Deployment Management Services (DMS) via an O2 interface, a second request to cordon the at least one O-Cloud node based on the received first request; and receive, from the IMS/DMS, a first notification that the at least one O-Cloud node has been cordoned, wherein the SMO function is at least one of a Federated O-Cloud Orchestration and Management (FOCOM) and Network Function Orchestration (NFO).

The second request may be an instruction to cordon a first O-Cloud node of the at least one O-Cloud node, wherein the first notification indicates that the first O-Cloud node has been condoned, wherein the at least one processor may further be configured to execute the computer-executable instructions to: transmit, by the SMO function to the IMS/DMS via an O2 interface, a third request to cordon a second O-Cloud node of the at least one O-Cloud node based on the received first request; and receive, from the IMS/DMS, a second notification that the second O-Cloud node has been cordoned.

The first request may be triggered by rApp of the Non-RT RIC or by a manual request submitted via a Service Management and Orchestration Framework (SMO).

The second request may only be transmitted by the SMO function to the IMS/DMS based on determining, by the SMO function, that the first request to cordon the at least one O-Cloud node is valid.

The at least one processor may be further configured to execute the computer-executable instructions to: control, by the IMS/DMS, to cordon the at least one O-Cloud node based on the second request to mark the O-Cloud node as unschedulable.

The at least one processor may be further configured to execute the computer-executable instructions to receive the first notification that the O-Cloud node has been cordoned by: receiving, from the IMS/DMS by the SMO function via the O2 interface, the first notification that the at least one O-Cloud node has been cordoned.

The at least one processor may be further configured to execute the computer-executable instructions to receive the first notification that the O-Cloud node has been cordoned by: receiving, from the SMO function by the rApp of the Non-RT RIC, the first notification that the at least one O-Cloud node has been cordoned.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

Figure 1:
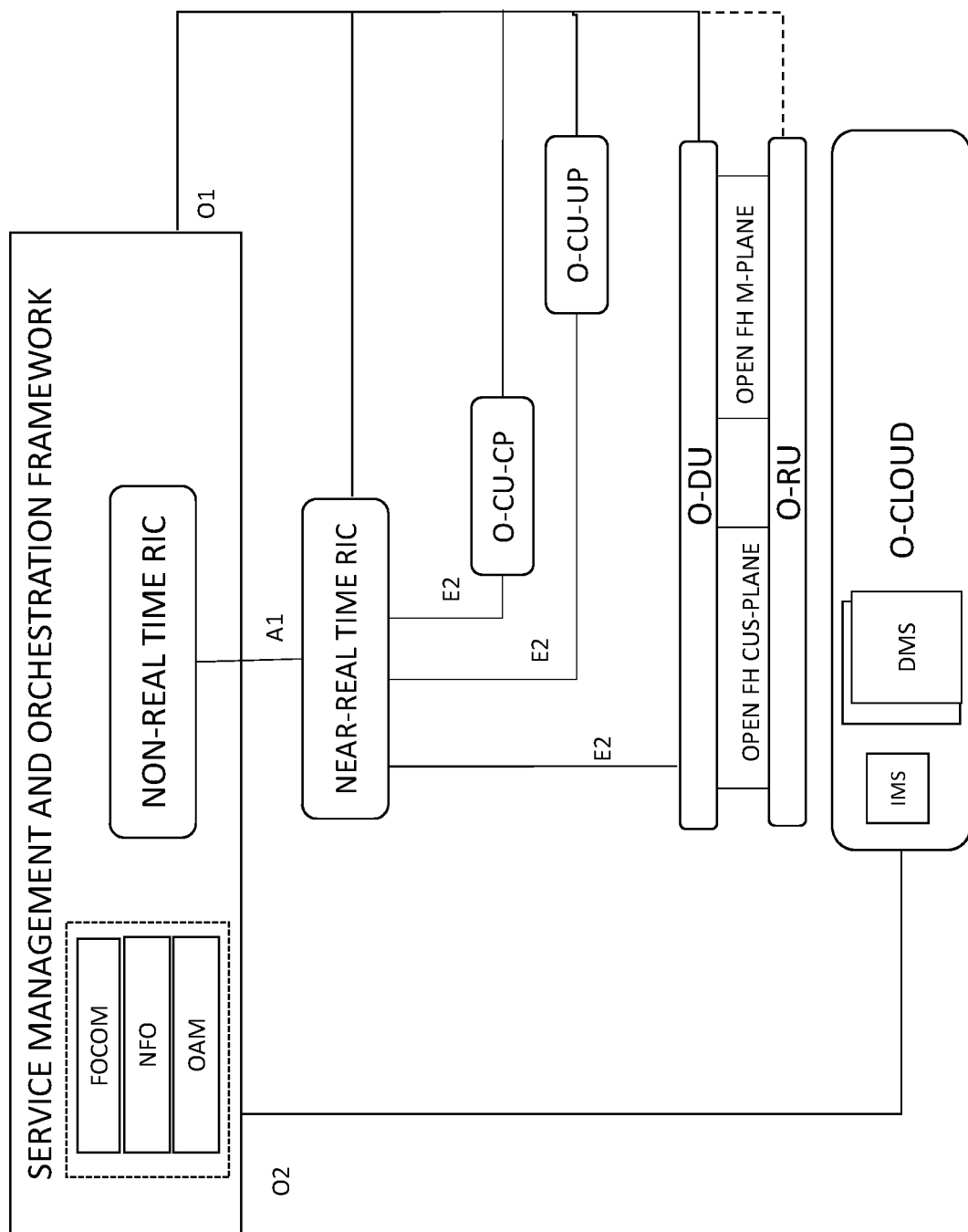
FIG. 1 illustrates an O-RAN architecture according to the related art.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system for cordoning an O-Cloud node in order to mark the O-Cloud node as unschedulable. Particularly, prior to the O-Cloud node being drained, an SMO function (e.g., at least one of the FOCOM and the NFO) may request for the IMS/DMS to cordon the O-Cloud node, thereby marking it not being able to be scheduled by a scheduler of the SMO (i.e., an unschedulable state). Accordingly, embodiments of the present disclosure may avoid scheduling errors (for instance, scheduling the instantiation of a network function when the O-Cloud node is being drained).

Figure 2:
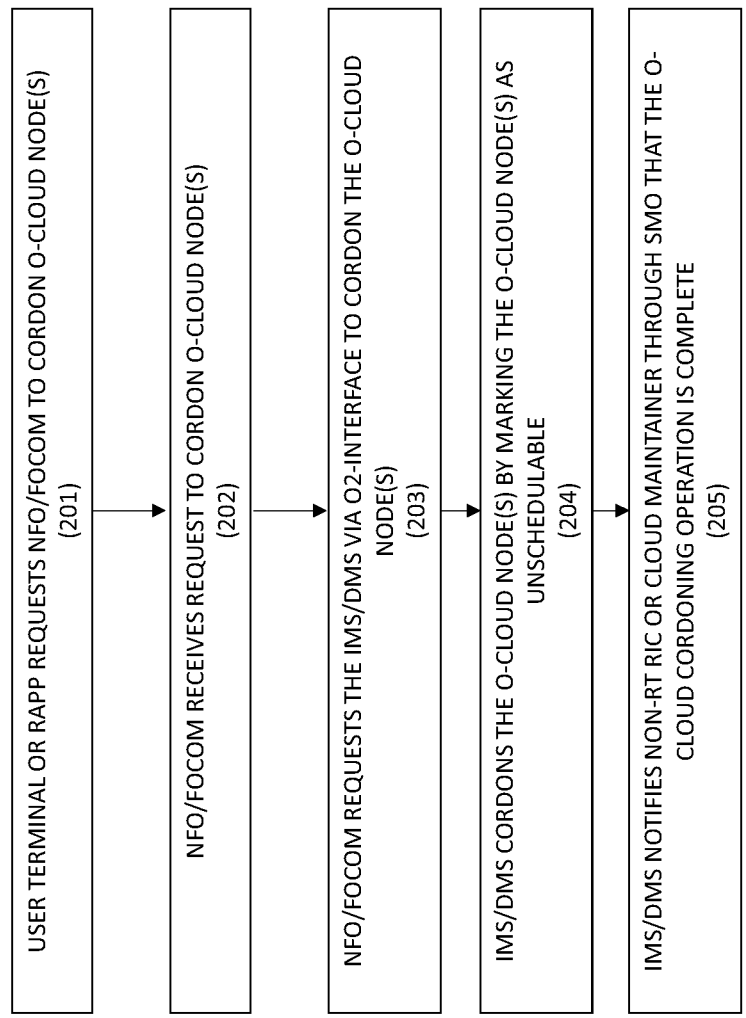
FIG. 2 is a flowchart of a method for cordoning an O-Cloud node using an O2 interface between an SMO function and the O-Cloud according to an embodiment.

FIG. 2 is a flowchart of a method for cordoning an O-Cloud node according to an embodiment. The method of FIG. 2 at operation S201 may be performed by the user terminal or rApp, operations S202-S203 may be performed by the SMO function (e.g., NFO and/or FOCOM), and operations S204-S205 may be performed by the IMS/DMS.

Referring to FIG. 2, the cordoning of O-Cloud Node(s) may be initiated at operation S201 by either a user via a user terminal (e.g., including an application for managing network functions and/or subscribed to receive alarm events, notifications, etc., from the SMO) or by one or more rApps of the Non-RT RIC within the SMO. Components of the O-RAN architecture in FIGS. 2, 3 are similar to those according to FIG. 1.

Figure 3:
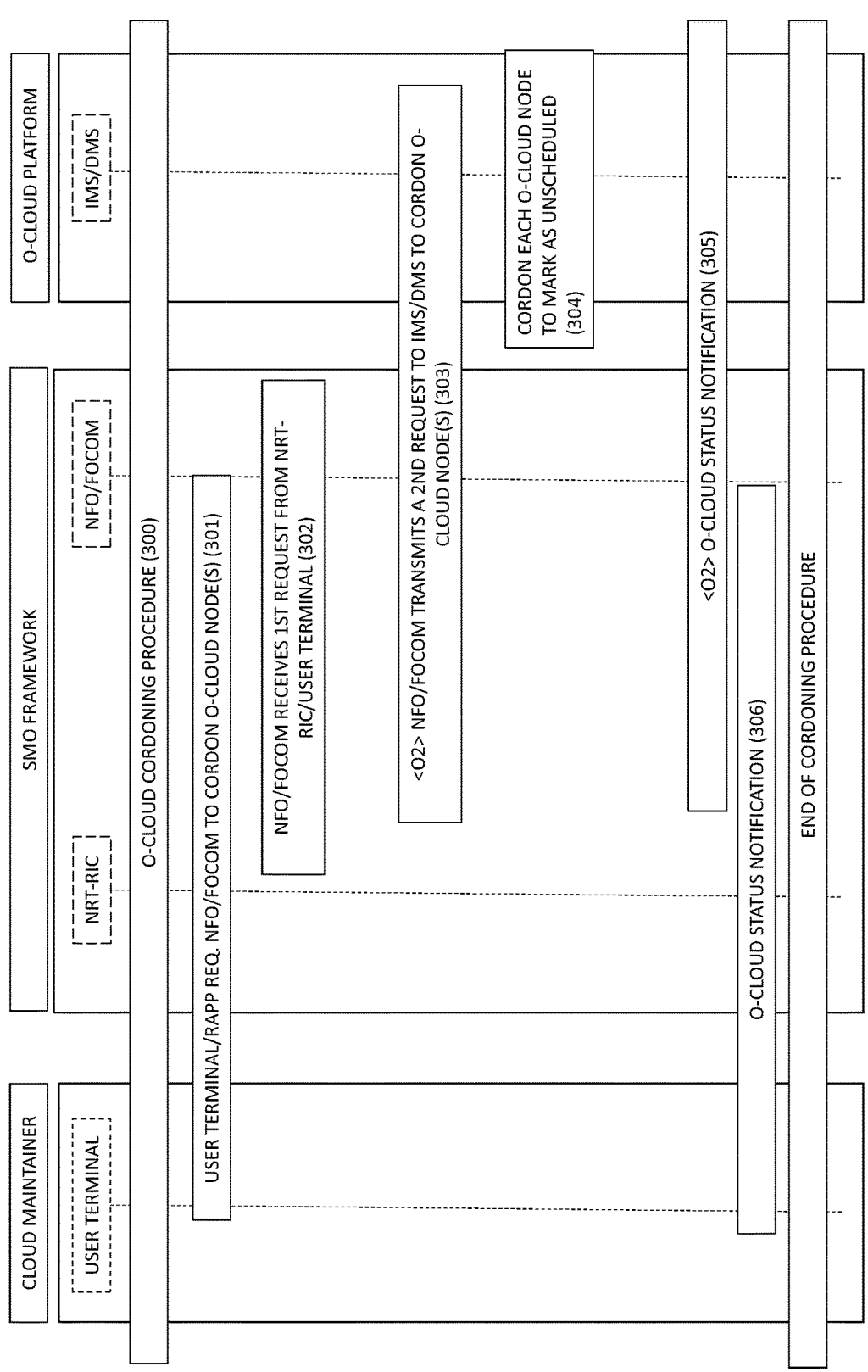
FIG. 3 is a diagram of an example environment in which systems described herein may be implemented for cordoning an O-Cloud node according to an embodiment.

Prior to the commencement of cordoning of O-Cloud node(s) as illustrated in FIGS. 2, 3 the availability of the SMO and the availability of the O-Cloud are assumed. In some example embodiments, it may also be assumed that the O-Cloud node(s) are in an idle state. Further, it may be assumed that there is network connectivity between the SMO and the O-Cloud, and there are no active deployments (network functions) on the O-Cloud node(s), and that the user terminal or rApps are subscribed to O1 and O2 events. Further, the Non-RT RIC or the above-mentioned user terminal are configured to be subscribed to receive notifications from the SMO. According to an embodiment, the request may be in the form of a trigger from the user terminal or rApps to the NFO/FOCOM. The request may also include the identifiers of the O-Cloud node(s) to be cordoned.

At operation S202, the NFO/FOCOM receives the request (first request) sent in operation S201 to cordon the one or more O-Cloud node(s). According to an embodiments, once the NFO/FOCOM receives the request, it may determine whether or not the request is valid (for instance, the NFO/FOCOM may determine whether the O-Cloud node(s) which are requested to be cordoned can be cordoned).

At operation S203 the NFO/FOCOM requests (second request) the IMS/DMS to cordon the one or more O-Cloud nodes based on the received first request. Here, the NFO/FOCOM may request the IMS/DMS to cordon the one or more O-Cloud nodes via the O2 interface, e.g., using O2ims services or O2dms services.

At operation S204 the IMS/DMS receives the request sent in operation S203 by the NFO/FOCOM, and performs an operation to mark the one or more O-Cloud node(s) as unschedulable, thereby cordoning said one or more O-Cloud node(s).

At operation S205, the IMS/DMS may notify the NFO/FOCOM indicating that the status of the cordon request, e.g. indicating that the cordon request is completed. The user terminal and/or the Non-RT RIC (i.e., rApp) may also receive this status update notification.

Operations S203, S204, and S205 may be looped or repeatedly performed for each of the one or more O-Cloud nodes identified in the first request. Further, the NFO/FOCOM may determine an order for cordoning the one or more O-Cloud nodes according to a predetermined criterion or randomly, and may transmit the second requests respectively corresponding to the one or more O-Cloud nodes in accordance with this determined order.

FIG. 3 illustrates a detailed method for implementing a cordoning procedure 300 of O-Cloud node(s) according to an embodiment. The method of FIG. 3 is performed by a user terminal (i.e., application installed therein) and/or Non-RT RIC (rApp), as well as a NFO/FOCOM and IMS/DMS.

Referring to FIG. 3, the method for implementing a cordoning procedure 300 of an O-Cloud node may be triggered by or based on input from the O2 interface (e.g., O2 telemetry data). According to another embodiment, the method may consider both O2 telemetry data received over the O2 interface and O1 telemetry data received over the O1 interface. For example, in a case of an NF load (e.g., compute, memory usage, etc.), an rApp may ingest historical load data metrics, correlate the metrics with other sources (e.g., O2 and/or O1 telemetry data), use AI/ML algorithms to predict a very high (e.g., greater than a predetermined threshold or metric) load time period (e.g., for next four hours), and provide prediction guidance to the NFO/FO-COM not to place any critical performance-sensitive workload on a specific node hosting the NF load. In this example, based on rApp guidance, the NFO/FOCOM may determine not to schedule work loads of a specific application on the node and/or not to schedule any new workload on that node in a Scale Out operation during the time period.

In operation 301, the user terminal or Non-RT RIC sends a first request to the NFO/FOCOM to cordon the O-Cloud node(s). The first request may include an identifier of the O-Cloud node(s). This may be similar to operation S201 described in FIG. 2 above.

In operation 302, the NFO/FOCOM receives the first request from the Non-RT RIC or user terminal to drain the O-Cloud node(s). This may be similar to operation S202 described in FIG. 2 above.

In operation 303, the NFO/FOCOM via the O2 interface sends a second request to the IMS/DMS to cordon the O-Cloud node(s) based on the received first request. This may be similar to operation S203 described in FIG. 2 above.

In operation 304, the IMS/DMS cordons each specified node. To this end, the IMS/DMS may mark the O-Cloud node as "unschedulable", so that the scheduler in the SMO will not instantiate any new deployments (i.e., network functions) on the O-Cloud node. This may be similar to operation S204 described in FIG. 2 above.

In operation 305, in an example embodiment, the IMS/DMS sends a confirmation notification of the completed draining procedure to the NFO/FOCOM via the O2 interface. In operation S306, the IMS/DMS may also (or alternatively) send the notification to the Non-RT RIC (rApp) and/or the user terminal (application), for example, based on whether they are subscribed to notifications from the IMS/DMS. Operations 305 and 306 may be similar to operation S205 described in FIG. 2 above.

In an embodiment, Operations 303 through 306 may be looped or repeatedly performed for each of the one or more O-Cloud nodes identified in the first request According to example embodiments, the process of cordoning an O-Cloud node can be readily performed upon receiving a trigger from the user terminal or non RT RIC (rApps), and thus, scheduling errors (for instance, scheduling the instantiation of a network function when the O-Cloud node is being drained) may be avoided.

Figure 4:
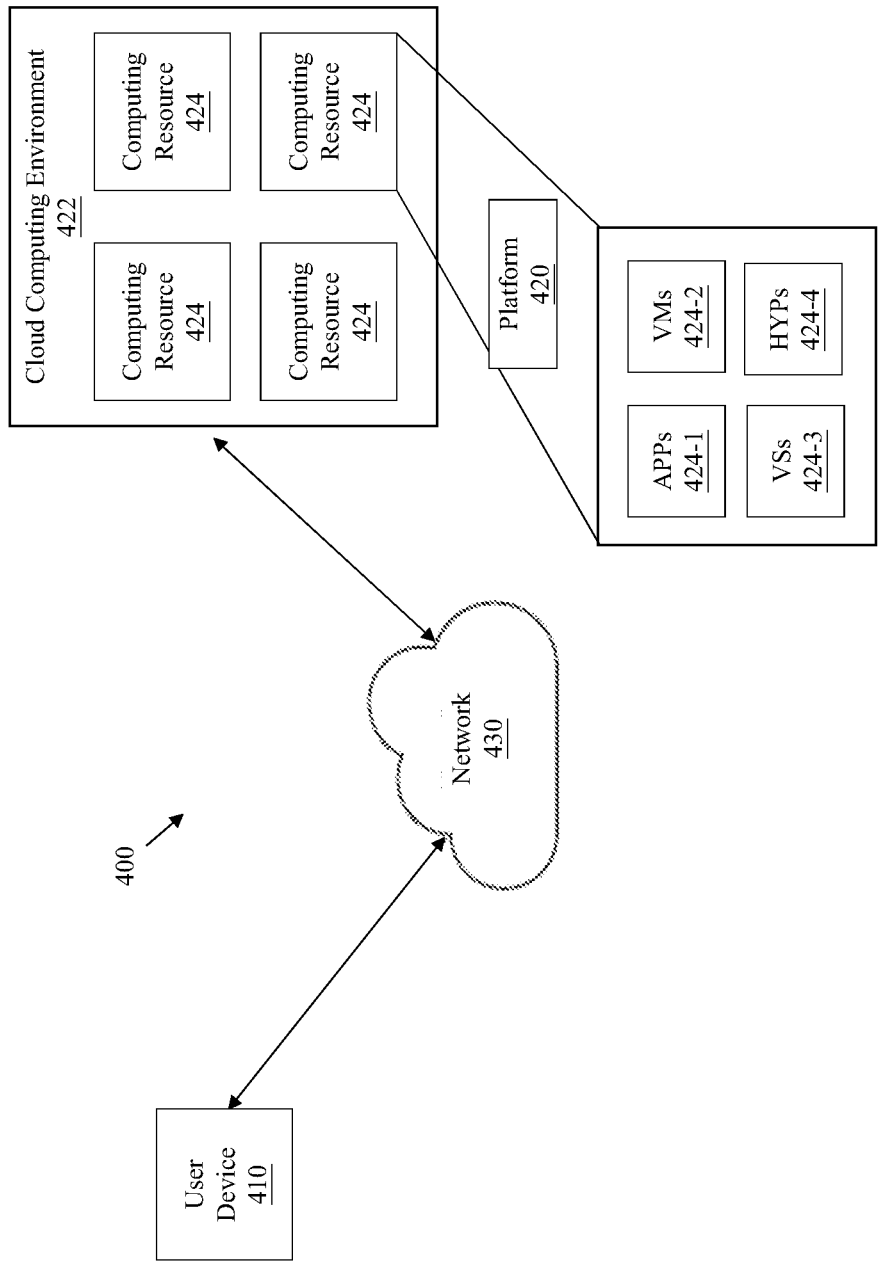
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 410, a platform 420, and a network 430. Devices of environment 400 may interconnect via wired connections, wireless connections, or a combination of wired and wireless connections. In embodiments, any of the functions and operations described with reference to FIGS. 2 through 3 above may be performed by any combination of elements illustrated in FIG. 4.

User device 410 includes one or more devices capable of receiving, generating, storing, processing, and/or providing information associated with platform 420. For example, user device 410 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 410 may receive information from and/or transmit information to platform 420.

Platform 420 includes one or more devices capable of receiving, generating, storing, processing, and/or providing information. In some implementations, platform 420 may include a cloud server or a group of cloud servers. In some implementations, platform 420 may be designed to be modular such that certain software components may be swapped in or out depending on a particular need. As such, platform 420 may be easily and/or quickly reconfigured for different uses.

In some implementations, as shown, platform 420 may be hosted in cloud computing environment 422. Notably, while implementations described herein describe platform 420 as being hosted in cloud computing environment 422, in some implementations, platform 420 may not be cloud-based (i.e., may be implemented outside of a cloud computing environment) or may be partially cloud-based.

Cloud computing environment 422 includes an environment that hosts platform 520. Cloud computing environment 422 may provide computation, software, data access, storage, etc., services that do not require end-user (e.g., user device 410) knowledge of a physical location and configuration of system(s) and/or device(s) that hosts platform 420. As shown, cloud computing environment 422 may include a group of computing resources 424 (referred to collectively as "computing resources 424" and individually as "computing resource 424").

Computing resource 424 includes one or more personal computers, a cluster of computing devices, workstation computers, server devices, or other types of computation and/or communication devices. In some implementations, computing resource 424 may host platform 420. The cloud resources may include compute instances executing in computing resource 424, storage devices provided in computing resource 424, data transfer devices provided by computing resource 424, etc. In some implementations, computing resource 424 may communicate with other computing resources 424 via wired connections, wireless connections, or a combination of wired and wireless connections.

As further shown in FIG. 4, computing resource 424 includes a group of cloud resources, such as one or more applications ("APPs") 424-1, one or more virtual machines ("VMs") 424-2, virtualized storage ("VSs") 424-3, one or more hypervisors ("HYPs") 424-4, or the like.

Application 424-1 includes one or more software applications that may be provided to or accessed by user device 410. Application 424-1 may eliminate a need to install and execute the software applications on user device 410. For example, application 424-1 may include software associated with platform 420 and/or any other software capable of being provided via cloud computing environment 422. In some implementations, one application 424-1 may send/receive information to/from one or more other applications 424-1, via virtual machine 424-2.

Virtual machine 424-2 includes a software implementation of a machine (e.g., a computer) that executes programs like a physical machine. Virtual machine 424-2 may be either a system virtual machine or a process virtual machine, depending upon use and degree of correspondence to any real machine by virtual machine 424-2. A system virtual machine may provide a complete system platform that supports execution of a complete operating system ("OS"). A process virtual machine may execute a single program, and may support a single process. In some implementations, virtual machine 424-2 may execute on behalf of a user (e.g., user device 410), and may manage infrastructure of cloud computing environment 422, such as data management, synchronization, or long-duration data transfers.

Virtualized storage 424-3 includes one or more storage systems and/or one or more devices that use virtualization techniques within the storage systems or devices of computing resource 424. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 424-4 may provide hardware virtualization techniques that allow multiple operating systems (e.g., "guest operating systems") to execute concurrently on a host computer, such as computing resource 424. Hypervisor 424-4 may present a virtual operating platform to the guest operating systems, and may manage the execution of the guest operating systems. Multiple instances of a variety of operating systems may share virtualized hardware resources.

Network 430 includes one or more wired and/or wireless networks. For example, network 430 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
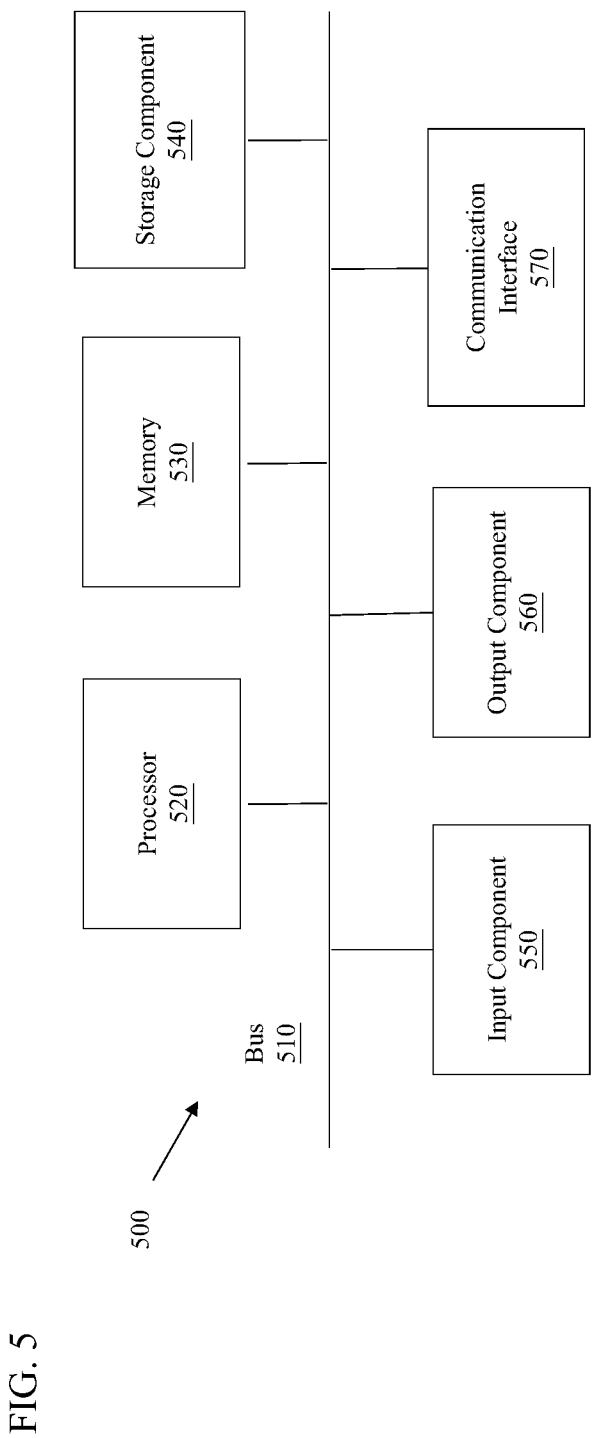
FIG. 5 is a diagram of example components of a device according to an embodiment.

FIG. 5 is a diagram of example components of a device 500. Device 500 may correspond to user device 410 and/or platform 420. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 may be implemented in hardware, firmware, or a combination of hardware and software. Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

In embodiments, any of the operations or processes of FIGS. 2 and 3 may be implemented by or using any one of the elements illustrated in FIGS. 4 and 5. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

These computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various Aspects of Embodiments

Various further respective aspects and features of embodiments of the present disclosure may be defined by the following items:

Item [1]: A method for cordoning one or more Open Radio Access Network (O-RAN) Cloud (O-Cloud) nodes, the method comprising: receiving, by a Network Function Orchestration (NFO) and/or a Federated O-Cloud Orchestration and Management (FOCOM), a first request to cordon at least one O-Cloud node, the first request being received from a user terminal or from a Non-Real-Time (Non-RT) RAN Intelligent Controller (RIC); transmitting, by the NFO/FOCOM to an Infrastructure Management Services (IMS) and/or a Deployment Managemetn Services (DMS) via an O2 interface, a second request to cordon the at least one O-Cloud node based on the received first request; and receiving, from the IMS/DMS, a first notification that the at least one O-Cloud node has been cordoned.

Item [2]: The method according to item 1, wherein the second request is an instruction to cordon a first O-Cloud node of the at least one O-Cloud node, wherein the first notification indicates that the first O-Cloud node has been condoned, the method further comprising: transmitting, by the NFO/FOCOM to the IMS/DMS via an O2 interface, a third request to cordon a second O-Cloud node of the at least one O-Cloud node based on the received first request; and receiving, from the IMS, a second notification that the second O-Cloud node has been cordoned.

Item [3]: The method according to any one of items [1]-[2], wherein the first request is triggered by a modular application (rApp) of the Non-RT RIC or by a manual request submitted via a Service Management and Orchestration Framework (SMO).

Item [4]: The method according to any one of items [1]-[3], wherein the second request is only transmitted by the NFO/FOCOM to the IMS/DMS based on determining, by the NFO/FOCOM, that the first request to cordon the at least one O-Cloud node is valid.

Item [5]: The method according to any one of items [1]-[4], further comprising: controlling, by the IMS/DMS, to cordon the at least one O-Cloud node based on the second request to mark the O-Cloud node as unschedulable.

Item [6]: The method according to any one of items [1]-[4], wherein receiving the first notification that the O-Cloud node has been cordoned further comprises: receiving, from the IMS/DMS by the NFO/FOCOM via the O2 interface, the first notification that the at least one O-Cloud node has been cordoned.

Item [7]: The method according to item [6], wherein receiving the first notification that the O-Cloud node has been cordoned further comprises: receiving, from the NFO/FOCOM by the Non-RT RIC, the first notification that the at least one O-Cloud node has been cordoned.

Item [8]: An apparatus for cordoning one or more Open Radio Access Network (O-RAN) Cloud (O-Cloud) nodes, the apparatus comprising at least one processor configured to execute computer-executable instructions to: receive, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC); transmit, by the SMO function to an Infrastructure Management Services (IMS) and/or Deployment Management Services (DMS) via an O2 interface, a second request to cordon the at least one O-Cloud node based on the received first request; and receive, from the IMS/DMS, a first notification that the at least one O-Cloud node has been cordoned, wherein the SMO function is at least one of a Federated O-Cloud Orchestration and Management (FOCOM) and Network Function Orchestration (NFO).

Item [9]: The apparatus according to item [8], wherein the second request is an instruction to cordon a first O-Cloud node of the at least one O-Cloud node, wherein the first notification indicates that the first O-Cloud node has been condoned, wherein the at least one processor is further configured to execute the computer-executable instructions to: transmit, by the SMO function to the IMS/DMS via an O2 interface, a third request to cordon a second O-Cloud node of the at least one O-Cloud node based on the received first request; and receive, from the IMS/DMS, a second notification that the second O-Cloud node has been cordoned.

Item [10]: The apparatus according to any one of items [8]-[9], wherein the first request is triggered by rApp of the Non-RT RIC or by a manual request submitted via a Service Management and Orchestration Framework (SMO).

Item [11]: The apparatus according to any one of items [8]-[10], wherein the second request is only transmitted by the SMO function to the IMS/DMS based on determining, by the SMO function, that the first request to cordon the at least one O-Cloud node is valid.

Item [12]: The apparatus according to any one of items [8]-[11], wherein the at least one processor is further configured to execute the computer-executable instructions to: control, by the IMS/DMS, to cordon the at least one O-Cloud node based on the second request to mark the O-Cloud node as unschedulable.

Item [13]: The apparatus according to any one of items [8]-[11], wherein the at least one processor is further configured to execute the computer-executable instructions to receive the first notification that the O-Cloud node has been cordoned by: receiving, from the IMS/DMS by the SMO function via the O2 interface, the first notification that the at least one O-Cloud node has been cordoned.

Item [14]: The apparatus according to item [13], wherein the at least one processor is further configured to execute the computer-executable instructions to receive the first notification that the O-Cloud node has been cordoned by: receiving, from the SMO function by the rApp of the Non-RT RIC, the first notification that the at least one O-Cloud node has been cordoned.

Item [15]: A non-transitory computer-readable recording medium having recorded thereon instructions executable by at least one processor to cause the at least one processor to perform a method comprising: receiving, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC); transmitting, by the SMO function to an Infrastructure Management Services (IMS) and/or Deployment Management Services (DMS) via an O2 interface, a second request to cordon the at least one O-Cloud node based on the received first request; and receiving, from the IMS/DMS, a first notification that the at least one O-Cloud node has been cordoned, wherein the SMO function is at least one of a Federated O-Cloud Orchestration and Management (FOCOM) and Network Function Orchestration (NFO).

Item [16]: The non-transitory computer-readable recording medium according to item [15], wherein the second request is an instruction to cordon a first O-Cloud node of the at least one O-Cloud node, wherein the first notification indicates that the first O-Cloud node has been condoned, the method further comprising: transmitting, by the SMO function to the IMS/DMS via an O2 interface, a third request to cordon a second O-Cloud node of the at least one O-Cloud node based on the received first request; and receiving, from the IMS/DMS, a second notification that the second O-Cloud node has been cordoned.

Item [17]: The non-transitory computer-readable recording medium according to any one of items [15]-[16], wherein the first request is triggered by rApp of the Non-RT RIC or by a manual request submitted via a Service Management and Orchestration Framework (SMO).

Item [18]: The non-transitory computer-readable recording medium according to any one of items [15]-[17], wherein the second request is only transmitted by the SMO function to the IMS/DMS based on determining, by the SMO function, that the first request to cordon the at least one O-Cloud node is valid.

Item [19]: The non-transitory computer-readable recording medium according to any one of items [15]-[18], further comprising: controlling, by the IMS/DMS, to cordon the at least one O-Cloud node based on the second request to mark the O-Cloud node as unschedulable.

Item [20]: The non-transitory computer-readable recording medium according to any one of items [15]-[18], wherein receiving the first notification that the O-Cloud node has been cordoned further comprises: receiving, from the IMS/DMS by the SMO function via the O2 interface, the first notification that the at least one O-Cloud node has been cordoned.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A method for cordoning one or more Open Radio Access Network (O-RAN) Cloud (O-Cloud) nodes, the method comprising:

receiving, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC);

transmitting, by the SMO function to an Infrastructure Management Services (IMS) and/or Deployment Management Services (DMS) via an O2 interface, a second request to cordon the at least one O-Cloud node based on the received first request; and receiving, from the IMS/DMS, a first notification that the at least one O-Cloud node has been cordoned, wherein the SMO function is at least one of a Federated O-Cloud Orchestration and Management (FOCOM) and Network Function Orchestration (NFO).

2. The method as claimed in claim 1, wherein the second request is an instruction to cordon a first O-Cloud node of the at least one O-Cloud node, wherein the first notification indicates that the first O-Cloud node has been condoned, the method further comprising:

transmitting, by the SMO function to the IMS/DMS via an O2 interface, a third request to cordon a second O-Cloud node of the at least one O-Cloud node based on the received first request; and receiving, from the IMS/DMS, a second notification that the second O-Cloud node has been cordoned.

3. The method as claimed in claim 1, wherein the first request is triggered by rApp of the Non-RT RIC or by a manual request submitted via a Service Management and Orchestration Framework (SMO).

4. The method as claimed in claim 1, wherein the second request is only transmitted by the SMO function to the IMS/DMS based on determining, by the SMO function, that the first request to cordon the at least one O-Cloud node is valid.

5. The method as claimed in claim 1, further comprising:
controlling, by the IMS/DMS, to cordon the at least one O-Cloud node based on the second request to mark the O-Cloud node as unschedulable.

6. The method as claimed in claim 1, wherein receiving the first notification that the O-Cloud node has been cordoned further comprises:
receiving, from the IMS/DMS by the SMO function via the O2 interface, the first notification that the at least one O-Cloud node has been cordoned.

7. The method as claimed in claim 6, wherein receiving the first notification that the O-Cloud node has been cordoned further comprises:
receiving, from the SMO function by the rApp of the Non-RT RIC, the first notification that the at least one O-Cloud node has been cordoned.

8. An apparatus for cordoning one or more Open Radio Access Network (O-RAN) Cloud (O-Cloud) nodes, the apparatus comprising:

at least one memory storing computer-executable instructions; and at least one processor configured to execute the computer-executable instructions to:

receive, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC);

transmit, by the SMO function to an Infrastructure Management Services (IMS) and/or Deployment Management Services (DMS) via an O2 interface, a second request to cordon the at least one O-Cloud node based on the received first request; and receive, from the IMS/DMS, a first notification that the at least one O-Cloud node has been cordoned, wherein the SMO function is at least one of a Federated O-Cloud Orchestration and Management (FOCOM) and Network Function Orchestration (NFO).

9. The apparatus as claimed in claim 8, wherein the second request is an instruction to cordon a first O-Cloud node of the at least one O-Cloud node, wherein the first notification indicates that the first O-Cloud node has been condoned, wherein the at least one processor is further configured to execute the computer-executable instructions to:

transmit, by the SMO function to the IMS/DMS via an O2 interface, a third request to cordon a second O-Cloud node of the at least one O-Cloud node based on the received first request; and receive, from the IMS/DMS, a second notification that the second O-Cloud node has been cordoned.

10. The apparatus as claimed in claim 8, wherein the first request is triggered by rApp of the Non-RT RIC or by a manual request submitted via a Service Management and Orchestration Framework (SMO).

11. The apparatus as claimed in claim 8, wherein the second request is only transmitted by the SMO function to the IMS/DMS based on determining, by the SMO function, that the first request to cordon the at least one O-Cloud node is valid.

12. The apparatus as claimed in claim 8, wherein the at least one processor is further configured to execute the computer-executable instructions to:

control, by the IMS/DMS, to cordon the at least one O-Cloud node based on the second request to mark the O-Cloud node as unschedulable.

13. The apparatus as claimed in claim 8, wherein the at least one processor is further configured to execute the computer-executable instructions to receive the first notification that the O-Cloud node has been cordoned by:

receiving, from the IMS/DMS by the SMO function via the O2 interface, the first notification that the at least one O-Cloud node has been cordoned.

14. The apparatus as claimed in claim 13, wherein the at least one processor is further configured to execute the computer-executable instructions to receive the first notification that the O-Cloud node has been cordoned by:

receiving, from the SMO function by the rApp of the Non-RT RIC, the first notification that the at least one O-Cloud node has been cordoned.

15. A non-transitory computer-readable recording medium having recorded thereon instructions executable by at least one processor to cause the at least one processor to perform a method comprising:

receiving, by a Service Management and Orchestration Framework (SMO) function, a first request to cordon at least one O-Cloud node, the first request being received from a user terminal or from an rApp of a Non-Real-Time (Non-RT) RAN Intelligent Controller (RIC);

transmitting, by the SMO function to an Infrastructure Management Services (IMS) and/or Deployment Management Services (DMS) via an O2 interface, a second request to cordon the at least one O-Cloud node based on the received first request; and receiving, from the IMS/DMS, a first notification that the at least one O-Cloud node has been cordoned, wherein the SMO function is at least one of a Federated O-Cloud Orchestration and Management (FOCOM) and Network Function Orchestration (NFO).

16. The non-transitory computer-readable recording medium as claimed in claim 15, wherein the second request is an instruction to cordon a first O-Cloud node of the at least one O-Cloud node, wherein the first notification indicates that the first O-Cloud node has been condoned, the method further comprising:

transmitting, by the SMO function to the IMS/DMS via an O2 interface, a third request to cordon a second O-Cloud node of the at least one O-Cloud node based on the received first request; and receiving, from the IMS/DMS, a second notification that the second O-Cloud node has been cordoned.

17. The non-transitory computer-readable recording medium as claimed in claim 15, wherein the first request is triggered by rApp of the Non-RT RIC or by a manual request submitted via a Service Management and Orchestration Framework (SMO).

18. The non-transitory computer-readable recording medium as claimed in claim 15, wherein the second request is only transmitted by the SMO function to the IMS/DMS based on determining, by the SMO function, that the first request to cordon the at least one O-Cloud node is valid.

19. The non-transitory computer-readable recording medium as claimed in claim 15, further comprising:

controlling, by the IMS/DMS, to cordon the at least one O-Cloud node based on the second request to mark the O-Cloud node as unschedulable.

20. The non-transitory computer-readable recording medium as claimed in claim 15, wherein receiving the first notification that the O-Cloud node has been cordoned further comprises:

receiving, from the IMS/DMS by the SMO function via the O2 interface, the first notification that the at least one O-Cloud node has been cordoned.

* * * * *